(12) United States Patent
Doherty et al.

(10) Patent No.: US 6,460,081 B1
(45) Date of Patent: Oct. 1, 2002

(54) SYSTEM AND METHOD FOR CONTROLLING DATA ACCESS

(75) Inventors: Thomas P. Doherty, Littleton; F. Warren Leblanc, Arvada; James R. Corliss, Thornton; Charles I. Cook, Louisville, all of CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/314,442

(22) Filed: May 19, 1999

(51) Int. Cl.[7] ............................................. G06F 15/173
(52) U.S. Cl. ..................... 709/225; 709/245; 713/201
(58) Field of Search ................................. 713/201, 200, 713/202; 709/229, 200, 219, 245, 223–225; 379/58; 380/247–250; 455/433

(56) References Cited

U.S. PATENT DOCUMENTS 5,742,668 A * 4/1998 Pepe et al. .................... 379/58
6,065,120 A * 5/2000 Laursen et al. .............. 713/201
6,128,503 A * 10/2000 Granberg et al. ........... 455/461
6,151,628 A * 11/2000 Xu et al. ...................... 709/225

* cited by examiner

Primary Examiner—Dung C. Dinh
Assistant Examiner—Kimberly Flynn
(74) Attorney, Agent, or Firm—Brooks & Kushman, P.C.

(57) ABSTRACT

A system and method for controlling data access by a user device on a network utilizes a subscriber database cataloging the device identity and the corresponding dynamic address. The system includes an interworking function device operative to receive a call from the user device. The user device has a corresponding dynamic address. The interworking function device sends a message to the subscriber database indicating the device identity and the corresponding dynamic address. The sent information is cataloged at the subscriber database to allow the server, when the server receives the corresponding dynamic address, to retrieve the device identity from the subscriber database and to control data access over the network based on the device identity.

20 Claims, 2 Drawing Sheets

SYSTEM AND METHOD FOR CONTROLLING DATA ACCESS

TECHNICAL FIELD

The present invention relates to systems and methods for controlling data access by a user device on a network.

BACKGROUND ART

In an existing data network, a variety of different user devices such as desktop computers, laptop computers, or even hand-held devices, are used to access data over the network. Typically, the network includes a server that the user device logs on to. In many cases, the server assigns a dynamic address to the user device. For example, in a transmission control protocol/Internet protocol (TCP/IP) network, a dynamic Internet protocol address or IP address is assigned to the logged on user device.

As additional user devices log on to the server, the server, in turn, dynamically assigns addresses, such as IP addresses in a TCP/IP network, to the user devices. As such, because the user device addresses are dynamically assigned, meaning that the same user device may receive different addresses during different network sessions, the server cannot distinguish between different user devices based on the device addresses.

As a result, data access control techniques are limited. In general, the server will give the same data access privileges to all user devices. This is a primary disadvantage in existing data access control techniques that utilize dynamic addresses for user devices. Alternatively, some servers require a user name and password. Of course, user name and password techniques are disadvantageous in that a person may be forced to have multiple user names and passwords. Further, user names and passwords may be stolen and then used by others.

For the foregoing reasons, there is a need for a system and method for data access control that overcomes the problems and limitations of the prior art.

DISCLOSURE OF INVENTION

It is, therefore, an object of the present invention to provide a system and method for controlling data access that utilizes dynamic addressing, while allowing data access control based on the device identity.

In carrying out the above object, and other objects, features and advantages of the present invention, a system for controlling data access by a user device on a network having a server, with the user device having a device identity, is provided. The system comprises an interworking function device operative to receive a call from the user device, and a subscriber database. A dynamic address is assigned to the user device. The interworking function device further operates to send a message indicating the device identity and the corresponding dynamic address to the subscriber database. The subscriber database receives the message from the interworking function device, and catalogs the device identity along with the corresponding dynamic address. Cataloging the device identity and the corresponding dynamic address allows the server, when the server receives the corresponding dynamic address from the user device, to retrieve the device identity from the subscriber database. Resultantly, the server may control data access over the network based on the device identity.

In one embodiment, the user device is a wireless device; and, the system includes a switch center operative to receive the call from the user device and route the call to the interworking function device. Further, preferably, the interworking function device operates to assign the dynamic address to the user device.

Preferably, the system includes a customer database cataloging the device identity and a set of corresponding services. The server, in turn, controls data access over the network based on the set of services corresponding to the device identity corresponding to the dynamic address. Further, preferably, the user device has a device type and the subscriber database catalogs the device type.

Further, in carrying out the present invention, a system for controlling data access by a user device on a network having a server, with the user device having a device identity, is provided. The system comprises an interworking function device, a subscriber database, and a customer database. The interworking function device operates to receive a call from the user device. The user device has a corresponding dynamic address assigned thereto. The interworking function device is further operative to send a message indicating the device identity and the corresponding dynamic address to the subscriber database. The subscriber database receives the message from the interworking function device, and catalogs the device identity and the corresponding dynamic address. As such, the server is allowed to retrieve the device identity from the subscriber database when the server receives the corresponding dynamic address from the user device. The customer database catalogs the device identity and a set of corresponding services. The server controls data access over the network based on the set of services corresponding to the device identity corresponding to the dynamic address. The user device is operative, through the server, to modify the sets of corresponding services upon demand by a user.

Still further, in carrying out the present invention, a method for controlling data access by a user device on a network having a server, with the user device having a device identity, is provided. The method comprises receiving a call from the user device at an interworking function device, sending a message from the interworking function device and receiving the message at the subscriber database, and cataloging the device identity and the corresponding dynamic address in the subscriber database. As such, the server is allowed to retrieve the device identity from the subscriber database, when the server receives the corresponding dynamic address, and to control data access over the network based on the device identity.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
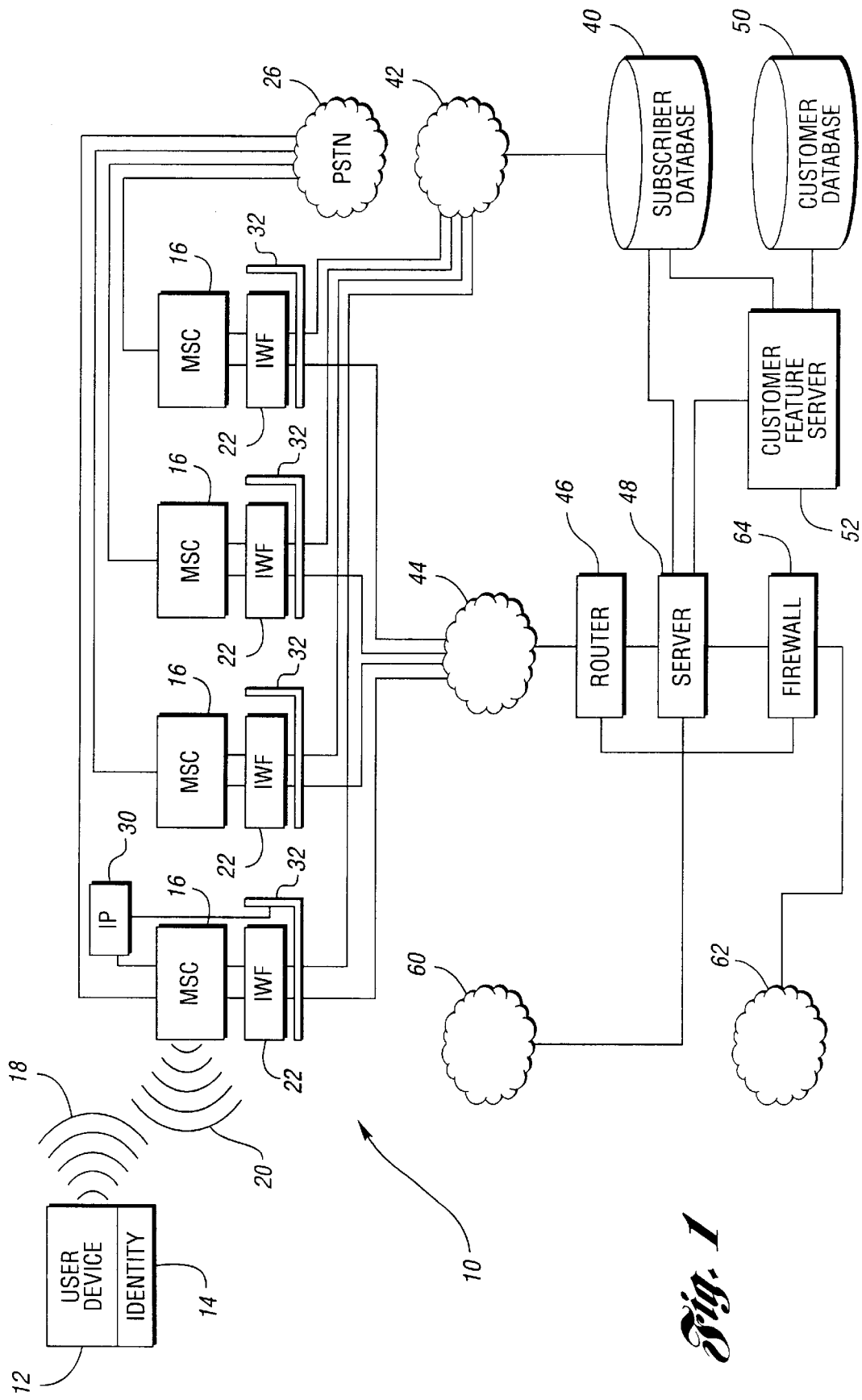
FIG. 1 is a system of the present invention for controlling data access by a user device on a network having a server, with the user device having a device identity, and with a dynamic address being assigned to the user device.

With reference to FIG. 1, a system of the present invention for controlling data access is generally indicated at 10. A user device 12 has a device identity 14. User device 12 initiates a call to a switch such as mobile switch center 16. It is to be appreciated by one of ordinary skill in the art that embodiments of the present invention have many advantages for wireless data calls, such as the initiation of Hayes AT commands, or a hypertext transfer protocol (HTTP) "GET" request message. The wireless data call may originate from either a personal digital assistant (PDA) or laptop computer in communication with a personal communication system (PCS) handset, or a microbrowser internal to the handset. The wireless data call may use various code division multiple access (CDMA) service options which are detected by the mobile switch center (MSC) 16. There may be several MSCs, one typically for a given metro or community area or city, although a city may have a plurality of MSCs, depending upon traffic requirements.

Of course, although it is appreciated that embodiments of the present invention have many advantages in wireless applications, embodiments of the present invention may be utilized in wireline applications if desired. That is, embodiments of the present invention which provide data access control may be employed in any system or method (wireless or wireline) that utilizes dynamic addressing. As such, if desired, for example, embodiments of the present invention may be employed in applications involving the home computer, or even the cellular phone or pager.

With continuing reference to FIG. 1, in which a preferred wireless application is illustrated, when user device 12 sends a transmission 18 that is within range 20 of MSC 16, MSC 16 recognizes the call. MSC 16 recognizes the call as being a data or fax call, and routes the call to an interworking function device (IWF) 22. Or, if services are embedded within a base station controller (BSC), the call may be routed to the BSC. If the call is a fax or dial-up data call bound for the publicswitched telephone network (PSTN) 26, then IWF 22 routes the call back to MSC 16 for analog completion through PSTN 26. Of course, one of ordinary skill in the art appreciates that there may be other exceptions when the call is routed back .through MSC 16, and that one practical example of such an exception is a call that is intended for the public-switched telephone network (PSTN) 26.

It is to be appreciated that the term "interworking function device" as used herein is meant to encompass any control logic configured to perform the IWF functions. As such, the IWF may take the form of a separate device, or may be integrated into the MSC or a BSC. Further, control logic may be hardware and/or software and/or any other known technologies for implementing control logic in a network. Thus, the term "interworking function device" as defined above includes control logic performed in a variety of techniques in addition to that which is specifically illustrated.

If the call does not fall under one of the exceptions that causes the call to be routed back through MSC 16, call authentication and control logic continues from IWF 22. That is, in accordance with the present invention, data calls are controlled at IWF 22.

In an alternative embodiment, some of the exception calls may be rerouted by a dedicated server connected to MSC 16 (on the voice side) to IWF firewall/router 32. For example, an IP telephony server 30 connected to MSC 16 on the voice side re-routes calls back to the IWF firewall/router 32.

Once IWF 22 begins control logic to handle the call, IWF 22 assigns a dynamic address to user device 12. Then, IWF 22 sends a message to a subscriber database 40, over a network 42 that is preferably low-latency. Subscriber database 40 receives device identity 14 and the dynamic address. In accordance with the present invention, subscriber database 40 catalogs device identity 14 and the corresponding dynamic address. Further, in a preferred embodiment, subscriber database 40 may use a variety of authentication techniques, such as secure socket layer private key. The authentication techniques validate that user device 12 has been authorized to use the wireless data services network. Of course, as mentioned above, embodiments of the present invention are not limited to wireless networks. Further, in a preferred embodiment, user device 12 has a device type. Preferably, subscriber database 40 catalogs device type, and is further operative to update the device type as necessary while the device 12 is logged on.

If the data call and its associated parameters, such as device identity 14 and the service type being requested from the network satisfy all needed service management layer conditions, then the data call is allowed to proceed. As such, subscriber database 40 provides routing instructions to IWF 22 providing the call over a network 44 to a router 46, and then to a server 48. In one embodiment, in which user device 12 is a hand-held device, server 48 may be a hand-held device markup-language (HDML) server.

Once the call from user device 12 reaches server 48, many advantages of embodiment of the present invention may already be observed. That is, server 48, which only recognizes user device 12 by its dynamic address, may access subscriber database 40 to retrieve identity 14 for user device 12. Because device identity 14 is cataloged by its dynamic address, server 48 will always be able to access subscriber database 40 to determine the true identity 14 of user device 12. The advantages to this are numerous. For example, server 48, knowing the true user at the dynamic address, may associate different sets of corresponding services or privileges with different device identities.

Or, if desired, these sets of privileges may be cataloged in a single subscriber database. Preferably, however, a customer database 50 catalogs device identity 14 and the set of corresponding services. In this preferred configuration, server 48, upon receiving a request from user device 12, may check with subscriber database 40 to determine the identity 14 of user device 12, and may then check customer database 50 to determine services or privileges that user device 12 is entitled to. Server 40 may allow access to a variety of different entitlements, depending on the information contained in customer database 50. Preferably, customer feature server 52 controls access to databases 40 and 50.

It is to be appreciated that, although only a single server 48 is shown, any number of servers may be accessible through network 44. Still further, a caller from user device 12, if desired, may be given access to servers on the public Internet 62, beyond firewall 64. Further, a particular Internet service provider (ISP), or the user's personal web page, or other internal web site or data application (behind or beyond firewall 64) may be accessed, so long as information cataloged within databases 40 and 50 permits access. In an embodiment of the present invention utilizing the personal web page at a server that is preferably behind firewall 64 on private network 44, the web page may provide a vehicle for allowing authorized users to change various services and features regarding their services. That is, the user may request new or cancel (or modify) existing services that are cataloged in customer database 50.

In one embodiment, the user utilizes a private secure socket layer security key located within user device 12 which is validated by subscriber database 40 or server 48. Upon validation, a user is allowed to access the user's personal web page, which may provide several menu options to add, change, or delete various services. Any authorized change are updated to customer feature server 52, which is also in communication with subscriber database 40 and customer database 50.

If the user does not have a private security key, one may be issued to that user by a certificate server (not specifically shown). In this case, server 48 issues a request to the certificate server for a private key. The certificate server validates with subscriber database 40 that the user is allowed to have a private key, and then initiates the process on the user's browser to receive the private key. Authorized persons may, in the alternative, also determine if the user should have a key. Then, such a key is generated for the user and sent to the user's e-mail server, for their inclusion into the user's browser. Preferably, server 48 provides an e-mail server capability that completes the private key request transaction.

In another embodiment, information may be sent to the user (terminating data calls), using, for example, Internet push technology. In mobile termination cases, a similar authentication and subscriber validation scheme is used to determine if the data call would be allowed to proceed to the handset or other computer device, connected to the handset.

It is to be appreciated that embodiments of the invention correlate device identity 14 with the dynamic address assigned (possibly by IWF 22). Advantageously, in addition to maintaining the identity to address correlation, subscriber database 40 acts as a gateway in determining what destinations (such as Universal Resource Locator, URL addresses) a particular device identity 14 may access. This functionality will be providing HLR/VLR-type authentication (Home Location Register/Visitors Location Register) for individual subscribers using the data network.

Figure 2:
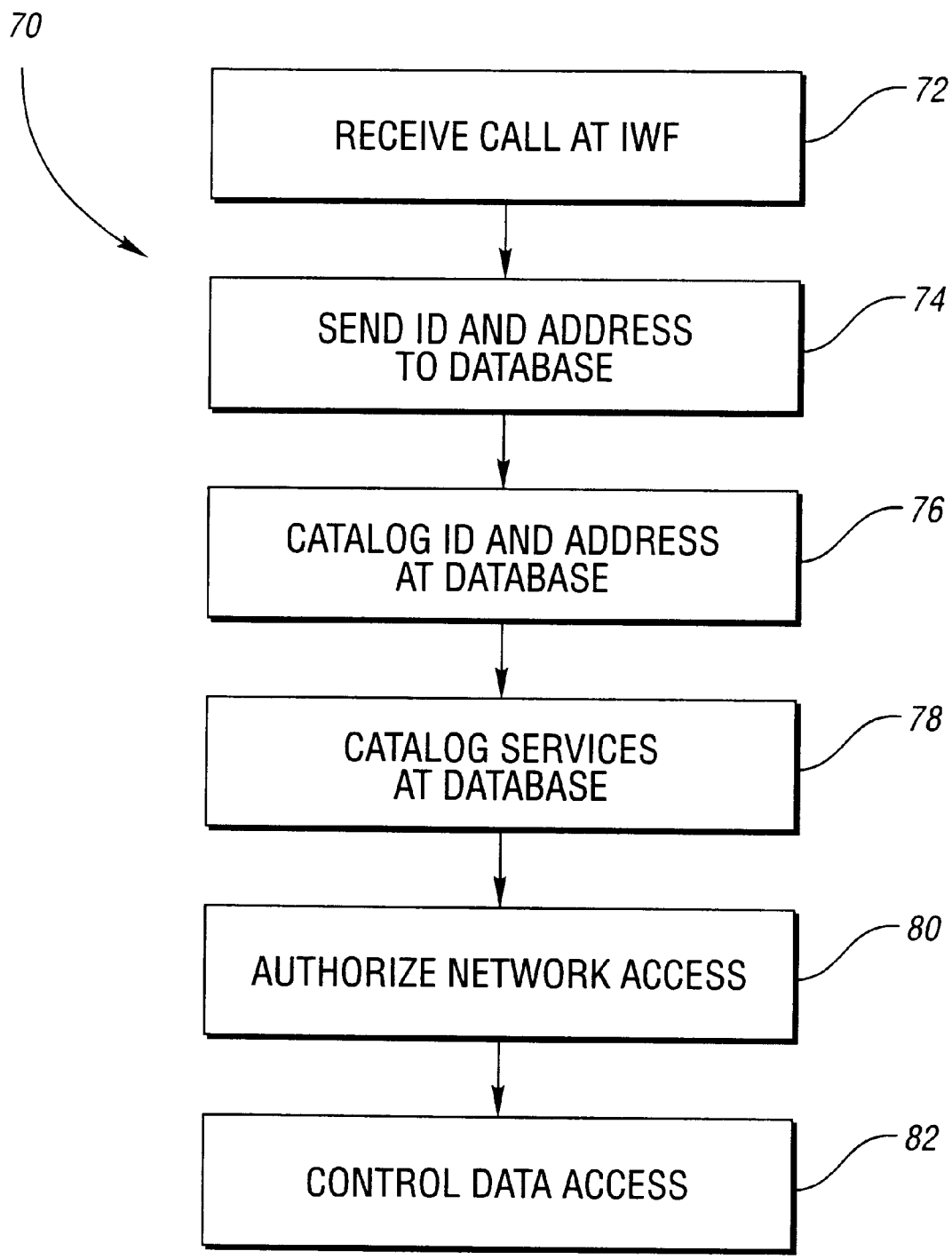
FIG. 2 is a method of the present invention for controlling data access by the user device.

With reference to FIG. 2, a method of the present invention is generally indicated at 70. At block 72, a call is received at the interworking function device, which as mentioned previously may take a variety of forms including implementation as a separate device, or integrated control logic at an MSC or BSC. At block 74, the interworking function device sends the device identity and the dynamic address to the (subscriber) database. At block 76, the identity and address are cataloged. If desired, in addition to maintaining a database of the relationship between device identity and dynamic address, services or entitlements may be cataloged in a (customer) database. Of course, the two databases may be implemented as a single database, if desired.

At block 80, network access is authorized upon validating that device identity 14 is permitted to be cataloged in the subscriber database. At block 82, data access is controlled by the server (or servers). As best shown in FIG. 1, server 48 controls data access by first checking with subscriber database 40 to obtain the true identity 14 that corresponds to the dynamic address of the user that is known to server 48. Thereafter, server 48, if the customer database is part of the implementation, may check with customer database 50 to determine what services or entitlements are available to the device by looking up the device identity corresponding to the dynamic address in the catalog in the subscriber database 40.

It is to be appreciated that embodiments of the present invention provide the ability to offer a wide variety of data services based on secure authentication techniques, service level offerings, intranet, Internet, and extranet combinations. Further, all data access allowance information may advantageously be stored in one or more databases on the network. Still further, embodiments of the present invention are not limited to any particular user device. As such, laptops, phone-embedded microbrowsers, and combination devices such as PCS phones and PDAs (for example, PALM III and WINDOWS CE machines), too name a few, may serve as appropriate user devices.

For those skilled in the art, it is appreciated that embodiments of the present invention are suitable for controlling data access over the network when user devices are assigned dynamic addresses. Although the description above describes operation of a system of the present invention when a call originates at the user device, those skilled in the art appreciate that embodiments of the present invention are equally suitable for calls that terminate or are destined for the user device. That is, the phrase "control data access over the network" is intended to mean control access to data when a call originates at the user device, and is further intended to mean control access to data when a call is intended to terminate or is destined for the user device. For example, embodiments of the present invention are suitable for determining when, for example, stock quotes are allowed to go through the network to the user device.

The controlling of data access for calls destined for the user device is achieved generally as follows. A request to send information to a destination dynamic address is received at the network server. The server checks a database to determine which user device corresponds to the dynamic address. No corresponding user device indicates that the user device is logged off of the network. When a corresponding user device is found in the database, if desired, the incoming call may be screened by the database in a manner similar to the screening of outgoing calls based on a set of services corresponding to the user device.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for controlling data access by a user device on a network having a server, the user device having a device identity, the system comprising:

an interworking function device operative to receive a call from the user device, the user device having a corresponding dynamic address assigned thereto, and the interworking function device being further operative to send a message indicating the device identity and the corresponding dynamic address; and a subscriber database receiving the message from the interworking function device, the subscriber database cataloging the device identity and the corresponding dynamic address to allow the server, when the server receives the corresponding dynamic address, to retrieve the device identity from the subscriber database and to control data access over the network based on the device identity.

2. The system of claim 1 wherein the user device is a wireless device.

3. The system of claim 1 further comprising:

a switch center operative to receive the call from the user device and to route the call to the interworking function device.

4. The system of claim 1 wherein the interworking function device is further operative to assign the dynamic address to the user device.

5. The system of claim 1 further comprising:
a customer database cataloging the device identity and a set of corresponding services such that the server controls data access over the network based on the set of services corresponding to the device identity corresponding to the dynamic address.

6. The system of claim 5 wherein the subscriber database and the customer database are implemented as separate databases.

7. The system of claim 6 further comprising:
a customer feature server for controlling access to the subscriber database and the customer database.

8. The system of claim 1 wherein the user device has a device type and the subscriber database catalogs the device type.

9. The system of claim 1 wherein the subscriber database is operative to validate that the user device is authorized to access the server.

10. The system of claim 1 wherein the subscriber database provides routing instructions to the interworking function device for routing the call to the server.

11. The system of claim 1 wherein the server is a handheld device markup language server.

12. A system for controlling data access by a user device on a network having a server, the user device having a device identity, the system comprising:
an interworking function device operative to receive a call from the user device, the user device having a corresponding dynamic address assigned thereto, and the interworking function device being further operative to send a message indicating the device identity and the corresponding dynamic address;
a subscriber database receiving the message from the interworking function device, the subscriber database cataloging the device identity and the corresponding dynamic address to allow the server, when the server receives the corresponding dynamic address, to retrieve the device identity from the subscriber database; and
a customer database cataloging the device identity and a set of corresponding services such that the server controls data access over the network based on the set of services corresponding to the device identity corresponding to the dynamic address,
wherein the user device is operative, through the server, to modify the set of corresponding services upon demand by a user.

13. A method for controlling data access by a user device on a network having a server, the user device having a device identity, the method comprising:
receiving a call from the user device at an interworking function device, the user device having a corresponding dynamic address assigned thereto;
sending a message from the interworking function device to a subscriber database, the message being indicative of the device identity and the corresponding dynamic address;
receiving the message at the subscriber database; and
cataloging the device identity and the corresponding dynamic address in the subscriber database to allow the server, when the server receives the corresponding dynamic address, to retrieve the device identity from the subscriber database and to control data access over the network based on the device identity.

14. The method of claim 13 wherein the method further comprises:
assigning the dynamic address to the user device wherein the assigning is performed by the interworking function device.

15. The method of claim 13 further comprising:
cataloging the device identity and a set of corresponding services in a customer database such that the server controls data access over the network based on the set of services corresponding to the device identity corresponding to the dynamic address.

16. The method of claim 15 wherein the subscriber database and the customer database are implemented as separate databases.

17. The method of claim 13 wherein the user device has a device type and the method further comprises:
cataloging the device type in the subscriber database.

18. The method of claim 13 further comprising:
authorizing the user device to access the server.

19. The method of claim 13 further comprising:
providing routing instructions to the interworking function device for routing the call to the server.

20. The method of claim 13 further comprising:
receiving a request to send information to a destination dynamic address;
determining the user device that corresponds to the destination dynamic address; and
sending the information to the user device.

* * * * *